United States Patent [19]

Katsuragawa et al.

[11] Patent Number: 4,749,610
[45] Date of Patent: Jun. 7, 1988

[54] GLASS FIBER REINFORCED FLEXIBLE COMPOSITE MATERIAL USING SOFT FLUORORESIN

[75] Inventors: Seiichi Katsuragawa, Tokorozawa; Chikashi Kawashima, Kamifukuoka; Tomio Masaki, Kawagoe, all of Japan

[73] Assignee: Central Glass Company, Limited, Ube, Japan

[21] Appl. No.: 15,069

[22] Filed: Feb. 17, 1987

[30] Foreign Application Priority Data

Feb. 20, 1986 [JP] Japan .................................. 61-33936

[51] Int. Cl.⁴ .......................... B32B 17/04; B32B 27/04
[52] U.S. Cl. ..................................... 428/228; 428/268; 428/421; 428/422
[58] Field of Search ............... 428/421, 422, 268, 228; 525/276

[56] References Cited

U.S. PATENT DOCUMENTS

| | | | |
|---|---|---|---|
| 3,934,064 | 1/1976 | Lowthian | 428/228 X |
| 4,472,557 | 9/1984 | Kawashima et al. | 525/276 |
| 4,612,238 | 9/1986 | DellaVecchia et al. | 428/228 |
| 4,702,956 | 10/1987 | Wilson et al. | 428/268 X |

FOREIGN PATENT DOCUMENTS

| | | | |
|---|---|---|---|
| 60-31859 | 7/1985 | Japan | 428/268 |
| 61-61849 | 3/1986 | Japan | 428/268 |

*Primary Examiner*—Thomas J. Herbert
*Attorney, Agent, or Firm*—Fleit, Jacobson, Cohn & Price

[57] ABSTRACT

A glass fiber reinforced flexible composite material is obtained by dispersing or embedding glass fiber in a fluororesin, which is a graft copolymer obtained by grafting a crystalline fluoro-polymer to an elastomeric fluoro-polymer. For example, the graft copolymer is obtained by graft polymerization of vinylidene fluoride with an elastomeric copolymer of vinylidene fluoride, chlorotrifluoroethylene and an unsaturated peroxy compound. The composite material possesses the physical and chemical properties characteristic of fluororesins and is flexible and easily melt processable. Sheets of this composite material using a glass fiber cloth have a soft feel and can easily be joined by high-frequency welding.

10 Claims, 1 Drawing Sheet

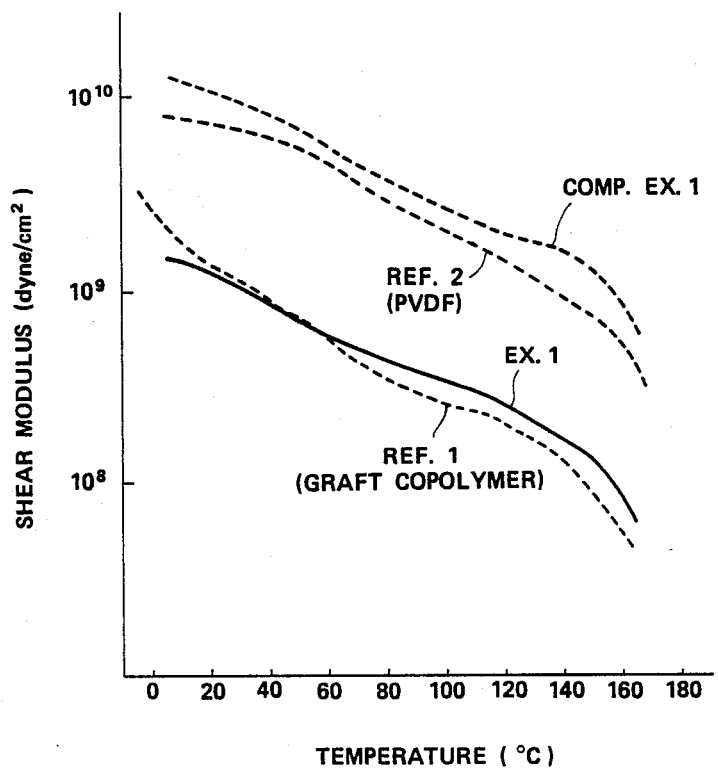

GLASS FIBER REINFORCED FLEXIBLE COMPOSITE MATERIAL USING SOFT FLUORORESIN

BACKGROUND OF THE INVENTION

This invention relates to a composite material which is made up of a fluororesin and glass fiber and possesses good flexibility and heat processability. The fluororesin used as the matrix is a graft copolymer having an elastomeric "trunk" segment and a crystalline "branch" segment.

Glass fiber reinforced plastics are used for many purposes and in various forms including sheet form, and the matrix material is selected from various resins such as polypropylene resins, polyester resins, polyamide resins, polyvinyl chloride resins and fluororesins with consideration of physical and chemical properties required for the composite materials and also economical factors.

Fluororesins are superior to other kinds of resins in weather resistance, chemical resistance and burn resistance because of having C-F bond very high in bond energy. Accordingly fluororesins are regarded as advantageous matrix materials for glass fiber reinforced composite sheets which may be used, for example, as wall facing materials, as anticorrosive lining materials for various vessels or containers, as wrapping and packaging materials, as electrical insulating materials and as tent materials. However, conventional fluororesins have some disadvantages in being used in the form of glass fiber reinforced resin sheet. First, conventional fluororesins other than fluororubbers are poor in flexibility so that the glass fiber reinforced composite sheets become stiff to the touch. Second, most of conventional fluororesins are not good in melt processability so that complicated techniques are required for embedding glass fiber in such resins. Besides, in the cases of conventional fluororesin sheets it is difficult to join or laminate a plurality of pieces of sheets by a high-frequency welding method which is the most convenient method for ordinary resin sheets.

In conventional fiber reinforced fluororesins a representative of the matrix resins is polytetrafluoroethylene (PTFE), which is hardly extrudable since its melting temperature is as high as about 330° C. Therefore, glass fiber reinforced PTFE sheets are usually produced by first impregnating glass fiber with a dispersion of PTFE and then performing a pressure shaping operation. When polyvinylidene fluoride (PVDF) having a lower melting temperature, about 171° C., is used as the matrix polymer it is possible to produce a glass fiber reinforced resin sheet by rolling a PVDF film extruded from a conventional extruder together with a glass fiber cloth. However, glass fiber reinforced PVDF sheets as well as glass fiber reinforced PTFE sheets lack flexibility.

SUMMARY OF THE INVENTION

It is an object of the present invention to provide a glass fiber reinforced composite material which uses a fluroresin as the matrix material and possesses flexibility together with excellent weather resistance, chemical resistance and burn resistance inherent to the fluororesin and which is weldable by a conventional high-frequency welding method when shaped into sheet form.

According to the invention there is provided a glass fiber reinforced composite material which comprises a fluororesin obtained by graft copolymerization of at least one fluorine-containing vinylic monomer, which gives a crystalline polymer not lower than 130° C. in melting temperature, with an elastomeric fluorocopolymer which has peroxy bonds and is lower than room temperature in glass transition temperature, and glass fiber which amounts to 3–60 wt % of the composite material and is embedded in and intimately adherent to the fluororesin. The glass fiber is combined with the fluororesin by once melting the fluororesin in the presence of the glass fiber.

In the composite material according to the invention the fluororesin as the matrix polymer is selected from a group of unique graft copolymers disclosed in U.S. Pat. No. 4,472,557. Every graft copolymer of this group has a fluorine-containing elastomeric "trunk" polymer segment and a fluorine-containing crystalline "branch" polymer segment. Grafting of the "branch" segment to the "trunk" segment is accomplished by utilizing thermal decomposition of peroxy bonds contained in the firstly prepared "trunk" polymer segment. In a preferred example of the graft copolymers an elastomeric copolymer of vinylidene fluoride (VDF), chlorotrifluoroethylene (CTFE) and t-butyl peroxyallylcarbonate is employed as the "trunk" segment, and PVDF as the "branch" segment.

The fluorine-containing graft copolymers concerned herein are, like conventional fluororesins, excellent in weather resistance, chemical resistance and burn resistance, and an important and distinct feature of these graft copolymers is possessing good flexibility. Glass fiber reinforced composite materials according to the invention retain the properties of the graft copolymer and, therefore, is flexible. The flexibility origins in the chemical structure of the graft copolymer. Since the "trunk" segment of the graft copolymer is an elastomeric copolymer whose glass transition temperature is below room temperature the graft copolymer is afforded with a rubber-like flexible property at room temperature and at higher temperatures. The flexibility of the glass fiber reinforced composite material is most appreciated when the composite material is in the form of sheet. In contrast to conventional glass fiber reinforced fluororesin sheets that feel stiff, the composite sheets according to the invention are soft to the touch and bear resemblance to rubber sheets.

Typical examples of fluororesins for use in this invention have melting temperatures of 155°–165° C., which are lower than the melting temperature (about 171° C.) of PVDF. Therefore, a glass fiber reinforced composite material of the invention can easily be produced at a relatively low temperature and at a reduced energy cost. When the composite material is in the form of sheet, it is possible to join a plurality of pieces of the sheet by using a conventional high-frequency welder for plastics. Therefore, it is easy to produce either a very wide and long sheet or a large-sized packaging bag by applying a high-frequency welding method to a glass fiber reinforced fluororesin sheet according to the invention. One reason for such weldability is the relatively low melting temperature of the employed fluororesin. Presumably another reason is that the dielectric loss factor (the product of dielectric constant and dielectric loss tangent) of the employed fluororesin is greater than the loss factor values of other kinds of fluororesins. For example, the dielectric constant of a fluororesin preferred in this invention (measured by the Q-meter method at 20° C. and at $10^6$ Hz) is 6.38 and the dielectric loss tangent is 0.28.

The glass fiber in the composite material according to the invention may be of any class and may be either short fibers or long fibers. In producing reinforced fluororesin sheets as preferred embodiments of the invention, it is suitable to use a woven or nonwoven cloth of glass fiber.

BRIEF DESCRIPTION OF THE DRAWING

The single FIGURE is a graph showing the relationship between temperature and shear modulus of elasticity of a glass fiber reinforced fluororesin sheet according to the invention in comparison with a conventional glass fiber reinforced fluororesin sheet and unreinforced fluororesin sheets.

DETAILED DESCRIPTION OF THE INVENTION

In preparing a fluorine-containing graft copolymer for use in this invention as a flexible matrix resin, the first step is copolymerizing at least one kind of fluorine-containing monomer and a different kind of monomer that has both double bond and peroxy bond (such a monomer will be called an unsaturated peroxide) at a temperature at which the peroxy bond in the unsaturated peroxide hardly decomposes. The copolymer is required to be elastomeric and to have a glass transition temperature lower than room temperature. For example, the elastomeric copolymer is a ternary copolymer of VDF, CTFE and an unsaturated peroxide, a ternary copolymer of VDF, hexafluoropropene (HFP) and an unsaturated peroxide, a quaternary copolymer of VDF, HFP, tetrafluoroethylene (TFE) and an unsaturated peroxide, a ternary copolymer of TFE, propylene and an unsaturated peroxide or a ternary copolymer of TFE, perfluorovinyl ether and an unsaturated peroxide.

Examples of useful unsaturated peroxides are t-butyl peroxymethacrylate, t-butyl peroxyacrylate, t-butyl peroxyallylcarbonate and n-butyl peroxyallylcarbonate. It is suitable that the proportion of the unsaturated peroxide to the fluorine-containing monomer(s) is in the range from 0.05:100 to 20:100 by weight.

The second step is grafting a fluorine-containing crystalline polymer whose melting temperature is not lower than 130° C. to the above described elastomeric copolymer. The grafting is accomplished by polymerizing a suitable fluorine-containing vinylic monomer in the presence of the elastomeric copolymer and a solvent or a liquid dispersion medium at a temperature high enough to decompose the peroxy bonds in the elastomeric copolymer. That is, the radicals formed by decomposition of the peroxy bonds induce polymerization of the vinylic monomer and grafting of the formed crystalline polymer to the elastomeric copolymer. The vinylic monomer subjected to graft polymerization is selected, for example, from VDF, TFE, HFP and vinyl fluoride and may be a mixture of at least two kinds of compounds one of which may be a simple hydrocarbon such as ethylene.

Since it is intended to obtain a graft copolymer having good flexibility, it is suitable that the proportion of the elastomeric copolymer as the "trunk" segment to the crystalline polymer as the "branch" segments falls in the range from 50:50 to 90:10 by weight.

The thus prepared fluorine-containing graft copolymers are relatively low in melting temperature as mentioned hereinbefore and can easily be formed into films, sheets and other shapes by extrusion using a T-die, by calendering or hot pressing or by injection molding or compression molding. These graft copolymers are excellent in weatherability. For example, when a graft copolymer using VDF and CTFE as the principal components of the elastomeric segment and PVDF as the grafted crystalline segment was subjected to an accelerated weathering test with a sunshine weather-O-meter to simulate 5000 hr weathering, the copolymer retained 90% of the initial tensile strength and 103% of the initial tensile 100% modulus. The graft copolymers exhibit excellent corrosion resistance to various chemicals such as hydrochloric acid, sulfuric acid, hydrofluoric acid, sodium hydroxide, ethanol and carbon tetrachloride. The graft copolymers are resistant to flame and hardly combustible. For example, combustibility testing of the graft copolymer mentioned at the above explanation of weatherability exhibited an oxygen index of 54, which means incombustibility in the atmosphere in which the oxygen concentration is about 20%.

A glass fiber reinforced composite material according to the invention contains 3–60 wt % of glass fiber. From a practical point of view a preferred range of the glass fiber content is from 5 to 40 wt %. The method of intimately combining glass fiber with a selected fluororesin (graft copolymer) is not limited. For example, an extrusion method can be employed. In every case the fluororesin has to be heated in the presence of glass fiber to a temperature somewhat higher than the melting temperature of the resin, and preferably up to 180°–200° C.

The composite material of the invention is very suitable for use in the form of a glass fiber reinforced fluororesin sheet. For example, such a sheet is produced by first preparing a film of the fluororesin by using a conventional extruder having a T-die, then sandwiching a sheet of glass fiber cloth between two sheets of the fluororesin film and compressing the resultant laminate by using heating and pressurizing rolls revolving at a relatively low rate or by using a hot press. At the hot rolling or hot pressing operation it is suitable to keep the laminated composite material at a temperature of 180°–200° C. and apply thereto a pressure of 10–50 kgf/cm$^2$.

In producing a glass fiber reinforced fluororesin sheet it is preferred to use a woven cloth of glass fiber though it is also possible to use a nonwoven cloth of glass fiber or chopped strands of glass fiber. Commercially available glass fiber cloths are various in the style of weaving as represented by plain weave, loose plain weave, satin weave, twill weave and leno weave. Glass fiber cloth of any type of weave can be used in this invention. Furthermore, glass fiber cloths are classified into numerous kinds in respect of thickness, yarn count (g/m$^2$), density (numbers of warp yarns and weft yarns per 25 mm square) and the kind of coupling agent for glass fiber surface treatment. In the present invention no limitation is placed on these items. That is, a glass fiber cloth most suitabale for the specifications of the reinforced fluororesin sheet can be selected from many candidates.

The invention is further illustrated by the following nonlimitative examples.

EXAMPLE 1

As the first step of preparing a desired graft copolymer, a fluorine-containing elastomeric copolymer was prepared by the following process.

Initially, 50.0 kg of purified water, 100 g of potassium persulfate, 150 g of ammonium perfluorooctanoate and 100 g of t-butyl peroxyallylcarbonate (abbreviated to BPAC) were put into a 100-liter stainless steel autoclave. After purging the gas atmosphere, 12.5 kg of VDF monomer and 7.55 kg of CTFE monomer were charged into the autoclave. The resultant mixture was subjected to copolymerization reaction at 50° C. for 20 hr with continuous stirring. The reaction product was a white latex, from which a rubber-like powder was recovered by salting-out treatment. The powder was washed with water, dried in vacuum, then washed with n-hexane to completely remove unreacted residue of BPAC and again dried in vacuum. The dried powder, which weighed 16.0 kg, was of an elastomeric copolymer of VDF, CTFE and BPAC. Thermal analysis of this copolymer with a differential scanning calorimeter (DSC) revealed the existence of an exothermic peak at 160°-180° C., which was attributed to decomposition of peroxy radicals. By DSC analysis at low temperatures the glass transition temperature, $T_g$, of this copolymer was determined to be −21° C. By iodometric titration the content of active oxygen in the copolymer was measured to be 0.042%.

Next, grafting of PVDF to the elastomeric VDF/CTFE/BPAC copolymer was carried out in the following manner.

Initially, 12.0 kg of the VDF/CTFE/BPAC copolymer in powder form and 75.0 kg of Freon R-113 were put into a 100-liter stainless steel autoclave. After purging the gas atmosphere 6.0 kg of VDF monomer was charged into the autoclave, and the resultant mixture was subjected to graft polymerization reaction at 95° C. for 24 hr. A solid portion of the reaction product was separated from the solvent and washed and dried to obtain 16.6 kg of the desired graft copoymer in the form of white powder. By DSC analysis the melting temperature of the graft copolymer was measured to be 155°-160°.

The graft copolymer, which will be referred to as the fluororesin, was extruded into a film having a thickness of 0.23 mm by using a conventional extruder having a T-die. The cylinder of the extruder was 30 mm in diameter and 22 in the length-to-diameter ratio. The revolving speed of the screw was 20 rpm, and the cylinder temperature was 200° C. in the middle section and 220° C. in the head section.

A glass fiber reinforced composite sheet was produced by using the fluororesin film and a glass fiber cloth (A) of plain weave (No. 7628 of Asahi-Schwebel Co.) 205 g/m$^2$ in weight. A sheet of the glass fiber cloth was sandwiched between two sheets of the fluororesin film (0.23 mm thick). The resultant laminate was sandwiched between two metal plates and placed in a hot press preheated to 190° C. For 4 min the laminate between the metal plates was left unpressurized for the purpose of preheating. Then the hot press was operated to keep the laminte under pressure of 40 kgf/cm$^2$ for 3 min. After that the laminate sandwiched between the metal plates was transferred into a cooling press and cooled for 3 min under pressure of 40 kgf/cm$^2$. The glass fiber reinforced composite sheet obtained by this method had a thickness of 0.55 mm.

Tensile strength of the glass fiber reinforced composite sheet was measured at room temperature by a method generally in accordance with JIS K 6888 for tetrafluoroethylene resin sheet, and Shore D scale hardness was measured at room temperature by a method generally in accordance with ASTM D 2240. The results are shown in the following table. Besides, shear modulus of elasticity of the composite sheet was measured at various temperatures by a torsion pendulum method using a viscoelastometer of RHESCA Co. The results are shown in the FIGURE in the drawing.

EXAMPLES 2 AND 3

In each of these examples a glass fiber reinforced composite sheet was produced by using the fluororesin prepared in Example 1 and a different kind of glass fiber cloth: in Example 2 a glass fiber cloth (B) of a loose plain weave (No. 7540 of Asahi-Schwebel Co.) 208 g/m$^2$ in weight, in Example 3 another glass fiber cloth (C) of a loose leno weave (No. 1659 of Asahi-Schwebel Co.) 56 g/m$^2$ in weight. In both Examples 2 and 3 the composite sheet construction and the sheet producing method were as described in Example 1. The glass fiber reinforced composite sheet of Example 2 was 0.53 mm in thickness, and the composite sheet of Example 3 was 0.47 mm in thickness. The properties of the obtained composite sheets are shown in the table and the FIGURE.

COMPARATIVE EXAMPLES 1 AND 2

A commercial PVDF resin, SOLEF 1010 of Solvey Co., was used in view of relatively good extrudability of PVDF among conventional fluororesins. The PVDF resin was extruded into a film having a thickness of 0.22 mm.

A sheet of the glass fiber cloth (A) (in Comparative Example 1) or the glass fiber cloth (B) (in Comparative Eample 2) was sandwiched between two sheets of the PVDF resin film. The resultant laminate was preheated, pressed and cooled in the same manner as in Example 1 except that the temperature of the hot press was raised to 200° C. When the hot press temperature was 190° C. as in Example 1 there were separations between the glass fiber cloth and the PVDF resin films. Therefore, the press forming temperature had to be raised by at least 10° C. The thickness of the obtained composite sheet was 0.58 mm in the case of Comparatie Example 1 and 0.56 mm in the case of Comparative Example 2. The properties of the composite sheets of Comparative Examples 1 and 2 are also shown in the table and the FIGURE.

REFERENCES 1 and 2

As Reference 1, several sheets of the flouroresin (graft copolymer) film prepared in Example 1 were put together in layers to obtain a laminated flouroresin sheet having a thickness of 1 mm. No glass fiber cloth was used. As Reference 2, several sheets of the PVDF resin film prepared in Comparative Example 1 were put together in layers to obtain a laminated PVDF sheet having a thickness of 1 mm. No glass fiber cloth was used. The properties of these two kinds of resin sheets are also shown in the table and the FIGURE.

| | Fluororesin | Glass Fiber Cloth | Thickness of Sheet (mm) | Tensile Strength (kgf/cm$^2$) | Shore D Hardness |
| --- | --- | --- | --- | --- | --- |
| Ex. 1 | graft copolymer | (A) | 0.55 | 960 | 53 |
| Ex. 2 | graft copolymer | (B) | 0.53 | 910 | 60 |
| Ex. 3 | graft copolymer | (C) | 0.47 | 490 | 48 |
| Comp. Ex. 1 | PVDF | (A) | 0.58 | 1200 | 78 |
| Comp. Ex. 2 | PVDF | (B) | 0.56 | 1100 | 76 |

| | Fluoro-resin | Glass Fiber Cloth | Thickness of Sheet (mm) | Tensile Strength (kgf/cm$^2$) | Shore D Hardness |
|---|---|---|---|---|---|
| Ref. 1 | graft copolymer | — | 1 | 310 | 46 |
| Ref. 2 | PVDF | — | 1 | 500 | 76 |

The test results in the table indicate that the glass fiber reinforced composite sheets according to the invention possess fairly high strength despite relatively low strength of the graft copolymer used as the exclusive resin component. Also it is seen that the composite sheets according to the invention are remarkably lower in hardness, which can be taken as an indication of flexibility, than the composite sheets using PVDF as the resin component. Furthermore, in the drawing FIGURE it is seen that the composite sheet according to the invention is lower than the composite using PVDF by a factor of about 10 in the value of shear modulus of elasticity measured as an indication of dynamic viscoelastic behavior. Such low shear modulus values are also indicative of good flexibility of the glass fiber reinforced composite according to the invention.

What is claimed is:

1. A glass fiber reinforced composite material, comprising:
   a fluororesin obtained by graft copolymerization of at least one fluorine-containing vinylic monomer, which gives a crystalline polymer not lower than 130° C. in melting temperature, with an elastomeric fluoro-copolymer which has peroxy bonds and is lower than room temperature in glass transition temperature; and
   glass fiber which amounts to 3-60 wt % of the composite material and is embedded in and intimately adherent to said fluororesin, said fluororesin being once melted in the presence of said glass fiber.

2. A composite material according to claim 1, wherein said glass fiber is in the form of a glass fiber cloth.

3. A composite mateial according to claim 2, wherein said glass fiber cloth is a woven cloth.

4. A composite material according to claim 2, wherein said glass fiber cloth is laid with and embedded in laminar layers of said fluororesin.

5. A composite material according to claim 1, wherein said glass fiber is in the form of short fibers.

6. A composite material according to claim 1, wherein said glass fiber amounts to 5-40 wt % of the composite material.

7. A composite material according to claim 1, wherein the ratio of said elastomeric fluoro-copolymer to the fluorine-containing crystalline polymer grafted to said fluoro-copolymer is in the range from 50:50 to 90:10 by weight.

8. A composite material according to claim 1, wherein said elastomeric fluoro-copolymer is selected from the group consisting of ternary copolymers of vinylidene fluoride, chlorotrifluoroethylene and another monomer which has both double bond and peroxy bond, ternary copolymers of vinylidene fluoride, hexafluoropropene and said another monomer, quaternary copolymers of vinylidene fluoride, hexafluoropropene, tetrafluoroethylene and said another monomer, ternary copolymers of tetrafluoroethylene, propylene and said another monomer and ternary copolymers of tetrafluoroethylene, perfluorovinyl ether and said another monomer.

9. A composite material according to claim 8, wherein said at least one fluorine-containing vinylic monomer comprises vinylidene fluoride.

10. A composite material according to claim 1, wherein said fluororesin is a graft copolymer obtained by graft polymerization of vinylidene fluoride in the presence of an elastomeric copolymer of vinylidene fluoride chlorotrifluoroethylene and another monomer which has both double bond and peroxy bond.

* * * * *